April 25, 1961 W. B. HUCKABAY ET AL 2,981,357
SUBMERGED STRATA ACOUSTIC PROBE SYSTEM
Filed Feb. 1, 1955 5 Sheets-Sheet 1

United States Patent Office 2,981,357
Patented Apr. 25, 1961

2,981,357

SUBMERGED STRATA ACOUSTIC PROBE SYSTEM

William B. Huckabay and Carroll D. McClure, Dallas, Tex., assignors to Socony Mobil Oil Company, Inc., a corporation of New York Filed Feb. 1, 1955, Ser. No. 485,559

5 Claims. (Cl. 181—.5)

This invention relates to methods of and systems for seismic surveying and has for an object the provision of a method and means for visually displaying the location and slope and other seismic information with respect to consolidated formations particularly those lying immediately below the usual unconsolidated layers forming the bed of a body of water over which the seismic survey is to be made. The visual presentation of the foregoing information is produced concurrently with the survey itself so that a seismic presentation of subsurface data is not only available at once but also it is known whether or not the instruments as a whole are properly functioning to detect and to provide the seismic information on the consolidated subsurface earth formations.

This application is a continuation-in-part of application Serial No. 415,860, filed March 12, 1954, now abandoned.

As water-covered areas of the earth have been explored for oil bearing formations, efforts have been made to apply the dry land techniques of seismic surveying and while satisfactory results have been obtained, much has been left to be desired in reducing the cost of an operation which is highly expensive even under favorable conditions.

Sound energy reflected from the ocean floor has been utilized as a means for charting the relief along the course followed by a vessel as an air to navigation. Usually a pulsed oscillator is utilized operating in the frequency range between 12,000 and 60,000 cycles per second, and the pulse repetition rate is made sufficiently low that the received echo pulses are returned to or adjacent the point of generation for electrical detection in the interval immediately following the corresponding generated pulse. Such high frequencies have been used in order to enhance the magnitude of energy reflected from the ocean floor, ignoring for the most part the desirablility of obtaining deeper reflections.

It has been found that by properly producing and faithfully detecting and recording relatively low frequency acoustic energy the character of the submerged strata, for example the bedding thickness and relative density of adjacent beds, may be determined. This procedure is used to advantage in the location of buried beds of oyster shells and the like suitable for commercial dredging operations. Further, the character of the submerged bedding may be in this manner studied to yield detailed geological information as to the environment under which strata now productive of petroleum once existed.

In accordance with the present invention, a predetermined volume of water is partially confined and to the partially confined volume of water there are successively applied compressional forces of large magnitude. The compressional seismic waves thereby generated in the water or liquid medium are then directed downwardly through the water toward the surfaces to be explored. It has been found that if power of a high order, as high as a megawatt, be utilized to produce said compressional forces, adequate seismic energy is generated for penetration through the normal unconsolidated layers and into and through the consolidated layers disposed several hundred feet below the water-bottom. The compressional force is applied at a rate of the order of 20 cycles per second with substantially continuous detection of the reflected energy. The detected energy is converted to electrical signals which, when visually displayed with time separation of the reflections, will not only yield depth determinations of each reflecting interface but will also visually display changes in inclination of the subsurface consolidated formations and will provide other seismic information such as the relative degrees of hardness of adjacent layers.

Further in accordance with the present invention, seismic surveys may be conducted rapidly and at reduced costs as compared with prior art practices with the resultant seismic information surprisingly useful. More particularly, the concurrent detection of both depth and slope of relatively shallow subsurface formations appears to be useful with respect to formations located far below the penetration depth of the seismic energy delivered to the consolidated layers. Thus while the invention is admirably suited to immediate low cost detection of salt domes located within a few hundred feet of the water ber, salt domes and other inclines suggestive of the presence of oil thereof located hundreds or thousands of feet below the water bed will give rise to typical orientation of the formations nearer the surface and thus provides data for the selection of the most likely areas over which surveys of higher resolution may be caried out and yet justify the manifold increase in cost thereof.

In a more specific aspect of the invention there is provided a relatively short magnetostrictive cylinder having a negative magnetostrictive coefficient together with an open ended cylindrical housing which encircles the magnetostrictive element and which is provided with sound absorbent means around the exterior of the magnetostrictive element and a cone-shaped reflector position inside and symmetrical to the axis of the magnetostrictive element and in which an acoustic match is provided to the water driven thereby upon excitation of the magnetostrictive element to produce a single cycle impulse.

In accordance with another aspect of the invention, a system is provided for registering the time sequence of generated and received signals on a space scale calibrated directly in depth units and in which the character of the received signals is retained.

For a more complete understanding of the present invention and for further objects and advantages thereof, reference may now be had to the following description taken in conjunction with the accompanying drawings in which.

Figure 1:
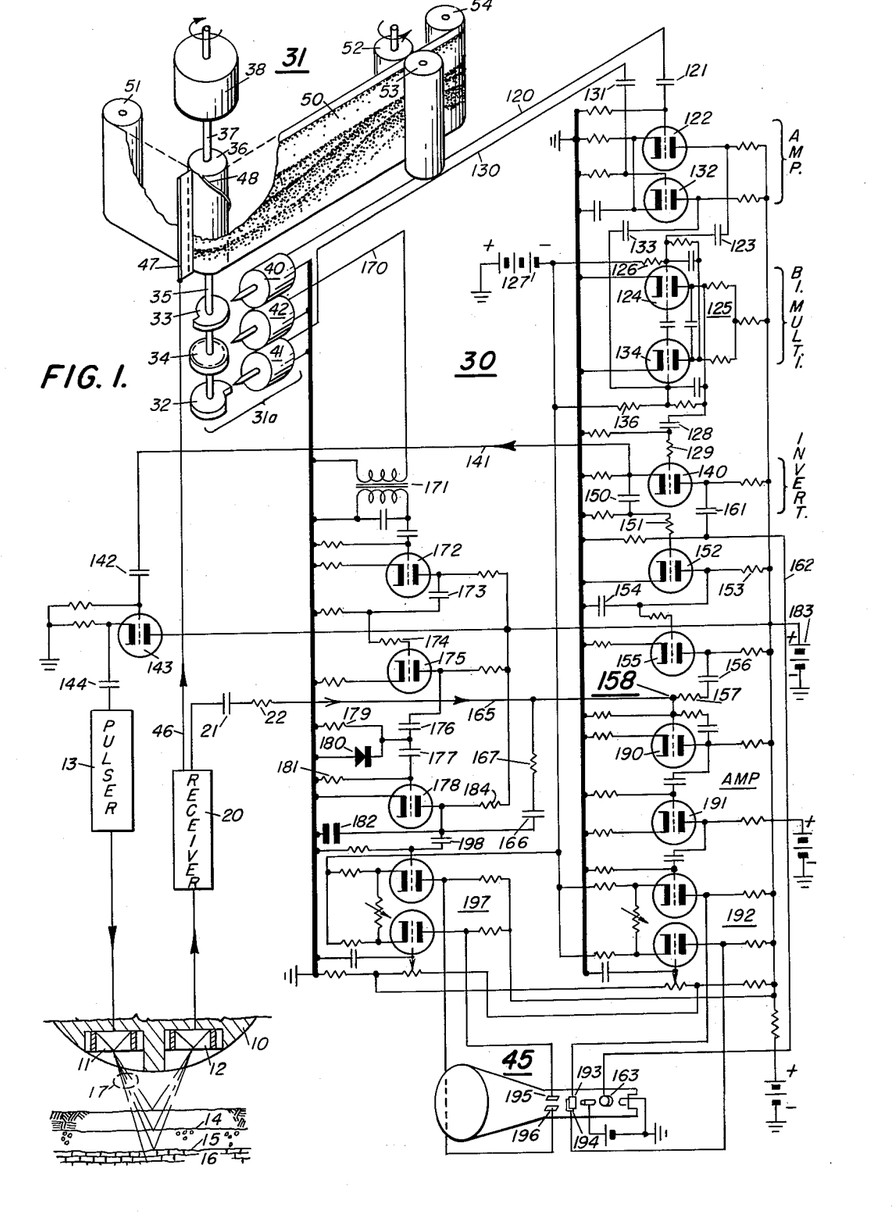
Fig. 1 illustrates an acoustic probe system.

Referring now to Fig. 1, there is illustrated an acoustic probing system which includes a vessel or tow structure 10, the bottom portion of which has been shown and which is adapted and designed to maintain a transmitter 11 and a receiver 12 carried thereby submerged in water over which a survey is to be made. The transmitter 11 is actuated from an energy source such as pulser 13 which applies sharp electrical pulses thereto to produce in the liquid overlaying submerged beds 14, 15 and 16 sharp acoustic pulses which travel by way of paths 17 to the floor of the submerged area and also to penetrate the floor for reflection from buried interfaces between beds 14, 15 and 16 and beds therebelow. Reflected energy than travels back to and is detected by a receiving transducer 12. Electrical signals thus produced are applied to a receiver 20 whose output in turn is connected through coupling impedances 21 and 22 to a control system 30.

The transmitter 11 and control system 30 are responsive to timing signals produced by the cam system 31a of a recorder 31. Cam system 31a includes two single step cams 32 and 33 and a multitoothed cam 34 all mounted on a shaft 35 which is coupled to a spiraled roller 36. Spiraled roller 36 is driven by shaft 37 of a motor 38. The speed of motor 38 is carefully controlled so that roller 36 and thus cams 32—33 rotate at a speed of 720 cycles per minute. By this means twelve pulses per second are produced in coils 40 and 41. Cam 34 is provided with twenty teeth or convolutions to produce in coil 42 a 240 cycle per second signal. It is to be noted that coils 40—42 are mounted on permanent magnet cores which terminate in points adjacent the associated cams 32—34. The variations in reluctance of the magnetic flux paths cause voltages to be induced in coils 40—42.

In response to the voltages thus produced the transmitter 11 is energized 12 times per second and signals reflected from submerged interfaces produce voltages in receiver 20 which are then applied to a cathode ray display 45 for visual detailed inspection and recording. The signals from receiver 20 also are applied through channel 46 to a knife edge electrode 47 positioned parallel to and adjacent the spiral roller 36. The output of receiver 20 appearing on channel 46 is of such character as to cause currents to flow through electrosensitive recording paper which is drawn between the edge of the electrode 47 and the raised spiral 48 on the periphery of cylinder 36. The voltages induced in coils 40—42 are synchronized with the rotation of cylinder 36 such that the upper edge of the spiral 48 registers with the upper end of the electrode 47 at the instant transmitter 11 produces an acoustic pulse. Since the rotation of cylinder 36 is constant, the progressive movement of the spiral 48 downward along the edge of electrode 47 is proportional to time and thus the point along electrode 47 of current flow between the electrode and the spiral 48 is progressively moved along a time scale proportional to the lapse of time following the generation of an acoustic pulse by transmitter 11.

Electrosensitive paper such as the strip 50 is driven at a constant rate from a supply roll 51 through driving rollers 52 and 53 to a take up roller 54. If the craft 10 moves through the water at a constant speed, then the length of the chart 50 is proportional to distance. Thus there may be produced on chart 50 a time plot of acoustic energy reflected from the top of submerged layer 14 as well as from the interfaces between submerged layers 14, 15 and 16.

It has been found that the presentation of acoustic probing data on chart 50 provides valuable information with respect to the depth and the attitude of submerged formations. The depth of penetration of the acoustic energy will of course depend upon the power applied from pulser 13 to the transmitter 11 and the electromechanical efficiency of the transmitter. It has been found that reflections from several hundred feet of depth may readily be obtained utilizing the system hereinafter described in detail and that the records thus produced clearly show submerged structures such as salt domes which have penetrated into the near surface layers. Inclines and other geological relief have also been detected which serve to guide more detailed exploration procedures to delineate petroleum bearing structures hundreds or thousands of feet below the maximum depth range of the present underwater seismic exploring system.

In addition to the presentation of the seismic data in the form of a continuous record on chart 50, a display is provided on the face of oscilloscope 45 which is representative of the time variations in the pressure waves sensed by the receiving transducer 12.

Figure 2:
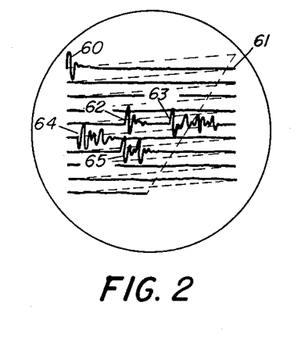
Fig. 2 illustrates a cathode ray registration of reflected energy.

Fig. 2 is a detailed view of the face of the oscilloscope 45 showing reflected energy on a time controlled space scale. Ten horizontal lines appear across the face of the oscilloscope 45 representing a continuum in the time domain. The point 60 on the first line 61 represents the instant of generation of an acoustic pulse by transmitter 11. The distinct wavelet 62 corresponds with a reflection from the top of submerged strata 14. The wavelet 63 corresponds with a reflection from the top of submerged strata 15 and in the same sense the wavelet 64 represents a reflection from the top of submerged strata 16. Wavelet 65 represents a reflection from a deeper bed.

It should be understood that a portrayal of received waves such as shown in Fig. 2 may in practice at times be found more complex than the waves illustrated. Nevertheless the time of arrival of each distinct packet of energy may be accurately noted and thus the time required for the acoustic energy to travel from the transmitter to each reflecting interface and return may be measured. A faithful recording of the character of the reflected energy along with its time relationships assists in determining the nature of the reflecting beds. Thus the face of the oscilloscope 45 may be photographed periodically over a given traverse by the vessel 10 to preserve the reflection character.

As will hereinafter be shown, provision is made for generating an acoustic pulse by transmitter 11 which is of non-resonant character, preferably comprising a single cycle of pressure oscillation so that the phase and amplitude observations displayed on the oscilloscope 45 may be relied upon positively to identify reflections and correlate the reflections with the dimensions and physical character of the submerged strata.

The structural features of the transducer in relationship with its environment are important in achieving the foregoing objects. One form of transmitter that has been found suitable has been illustrated in Figs. 3 and 4. Where consistent, like parts have been given the same reference characters.

Figure 3:
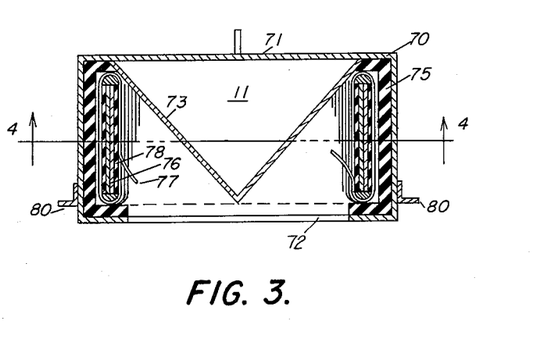
Fig. 3 is a sectional view of a transducer unit of Fig. 1.
Figure 4:
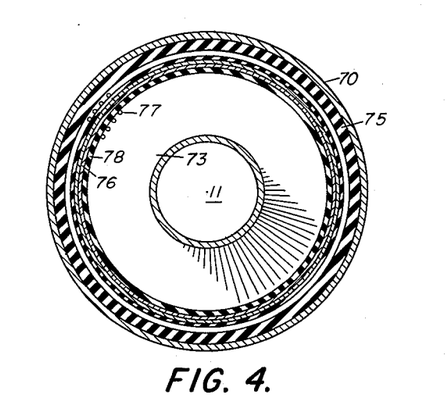
Fig. 4 is a sectional view of the transducer taken along lines 4—4 of Fig. 3.

The transmitter 11 includes a housing 70 which is a relatively short cylinder or drum closed at one end by plate 71 and having a circular opening 72 in the other end. A cone 73 is secured in a liquid tight fashion as by welding along its edges to the end plate 71. Cone 73 along with the end plate 71 forms an air filled enclosure. The inside of the drum 70 is lined with a mat 75 of sound absorbent material. The transducer element proper is mounted inside of the mat or cushion 75 and includes two layers 76 of magnetostrictive sheet metal. In one form the core 76 of the transducer comprised a two-turn scroll of electronic nickel strip metal approximately 6" wide and .016" thick. A toroidal winding 77 was formed around the core 76, separated therefrom by a thin insulating film 78. In one embodiment the toroidal winding comprised approximately 440 turns of No. 16 copper wire insulated with gray rubber insulation and an outer coat of neoprene.

The core 76, with a negative magnetostrictive coefficient, upon application of an electrical pulse to the toroidal winding 77 contracts to produce a pressure wave which travels toward the surface of the cone 73. The acoustic energy is then reflected downward to the submerged interfaces between layers 14, 15 and 16. It should be noted that cylinder 70 is provided with lugs 80 to facilitate mounting with the opening 72 facing the bed 14, Fig. 1, so that acoustic energy is beamed downwardly from the transmitter.

Figure 5:
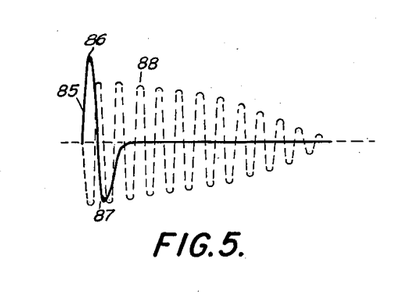
Fig. 5 illustrates acoustic pulse output of the system shown in Figs. 1, 3 and 4.

The transmitter shown in Figs. 4 and 5, properly constructed and energized, has been found to produce a substantially non-resonant acoustic pulse in the adjacent fluids. Pulse 85, Fig. 5, is of the desirable character and is characterized by an abrupt rise to a maximum 86 followed by one negative half-cycle 87. An aspect of applicant's invention insofar as it involves a mode of operation of the transducer may be distinguished from prior art systems by comparing the character of pulse 85 with the resonant wave 88, shown dotted. Wave 88 is, in general, representative of the operation of prior art systems in which a pulsed oscillator is utilized to energize a transducer or in which transducers themselves because of their construction produce a resonant type wave. Applicant has found that by properly matching and damping the transducer electrically and/or mechanically, a relatively simple acoustic pulse may be produced. The specific manner of determining the preferred degree of matching and damping will be explained later in detail.

Figure 6:
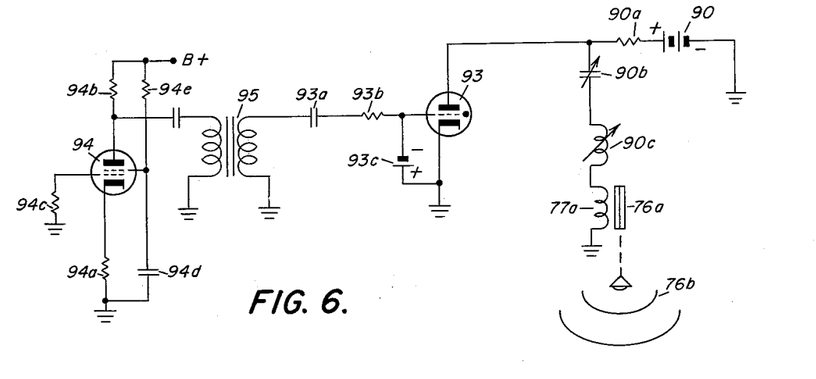
Fig. 6 is a schematic diagram of a pulsing network.

The transmitter 11 is excited from pulser 13, Fig. 1, which may include a circuit such as shown in Fig. 6.

The pulsing network, Fig. 6, includes a charging circuit including a battery 90, resistor 90a, a storage condenser 90b, an inductance 90c and the winding 77a of the transmitter 11. The winding 77a and the core 76a diagrammatically represent corresponding elements 77 and 76 of Figs. 3 and 4. Condenser 90b accumulates a charge such that the potential across it is equal and opposite the potential of battery 90. Condenser 90b is then discharged through a thyratron 93 to pulse the magnetostrictive core 76a.

The control for the thyratron 93 includes a tetrode 94 having its cathode connected to ground by way of an impedance 94a. Its anode is connected to B+ by way of impedance 94b and its grid connected to ground by way of impedance 94c. The screen grid is connected to ground by way of condenser 94d and to B+ by way of resistor 94e. The anode is connected to the grid of tube 93 by way of a transformer 95 whose secondary winding is connected in series with a capacitor 93a and resistor 93b. When a pulse is applied to the grid of tube 94, the bias from battery 93c connected to the grid of tube 93 is overcome, thus initiating conduction in tube 93. The abrupt discharge of condenser 90b through the winding 77a causes contraction of the core material 76a producing an acoustic pulse diagrammatically represented by waves 76b.

In practice the transducer of Figs. 3 and 4 is acoustically matched to the liquid coupled thereto by an empirical procedure which may include placing the transducer in a body of water which is large in dimension compared to a wave length of the sound to be generated and then repeatedly actuating the transducer by firing tube 93 and observing the resultant waveform.

It is desirable to produce non-resonant pulses such as pulse 85, Fig. 5. If a transducer such as shown in Fig. 3 produces pulses which have resonant character, such as the wave 88, this is an indication of excessive magnetostrictive material in the layers 76, Fig. 3. Use of thinner laminations will reduce the resonance of the output. Trial and error will lead to an optimum pulse character using as the criteria for producing the proper match between the transmitter and the driven liquid, the presence or absence of non-resonant pulse character.

It should be kept in mind that sufficient number of turns should be provided in the winding 77 and a suitable electrical source utilized therewith completely to saturate the magnetostrictive core. Over-damping or use of too little core material will result in loss of amplitude of the received pulse. Thus by varying the volume of core material, a match can be reached. It will be appreciated that the acoustic match between the transducer and the liquid is frequency-dependent so that the rise time (or the phase) of the pulse 85 will be controlled principally by the matching procedures above described.

The condenser 90b and inductance 90c along with the inductance of winding 77a, Fig. 6, should be such that the electrical resonance frequency of their discharge circuit corresponds to the frequency at which the transducer is properly matched to the liquid.

Figure 7:
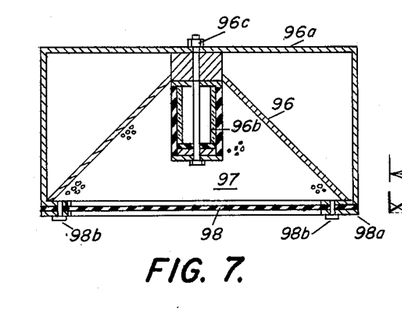
Fig. 7 is a sectional view of a crystal type transducer.

Another form of transducer has been illustrated in the sectional view of Fig. 7. In this form, energy is directed downwardly from an inverted cone 96 which, together with a short closed metallic cylinder section 96a, forms a suitable acoustic reflector. A piezo-electric crystal 96b is mounted inside and co-axially of cone 96. A bolt 96c secures in place crystal 96b together with suitable insulating and mounting members. The walls of the cone 96 subtend an angle of 90° so that pressure waves generated upon application of voltages to the inner and outer surfaces travel horizontally from crystal 96b and are directed downwardly to the ocean floor.

Crystal 96b in one embodiment of the invention was approximately 6" in length, 3" in diameter and of wall thickness of approximately ⅜". The crystal was formed of barium titanate. The crystal itself was matched to the contacting liquid by providing a limited volume of acoustic transmitting material having a bulk modulus between that of the crystal itself and the liquid outside the cone. More particularly, the space 97 was filled with a mixture of castor oil and sand and then covered and retained in place by a relatively thin rubber membrane 98 which was secured to the periphery of the cone 96 as by a clamping ring 98a fastened by screws 98b. By suitably selecting the ratio of oil to sand in the space 97, the transducer was capable of operation such as to produce substantially non-resonant pulses in a relatively low frequency range.

Figure 8:
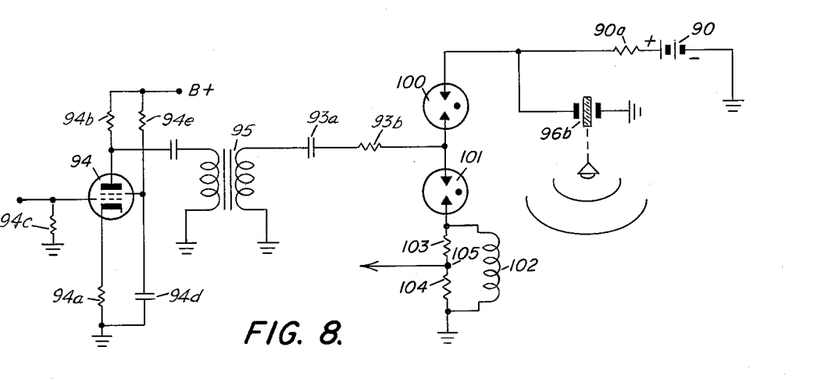
Fig. 8 is a schematic diagram of a pulse network for the transducer of Fig. 7.

The system shown in Fig. 8 corresponds generally to that shown in Fig. 6 but is adapted to drive the piezo-electric type transducer of Fig. 7. Where consistent, like parts have been given the same reference characters as in Fig. 6. In this system the piezo-electric element 96b is charged from battery 90 through resistance 90a. The crystal is then discharged by firing the gas discharge tubes 100 and 101 by a pulse from tube 94. The discharge path includes the tubes 100, 101 connected in series and to a ground connection by way of inductance 102. Series resistors 103 and 104 are connected in parallel to inductance 102. The point 105 intermediate resistors 103 and 104 provides a tap for a suitable control voltage which is used to control the visual display of pulses reflected from a point below the crystal 96b as will be explained in connection with Fig. 12.

Figure 9:
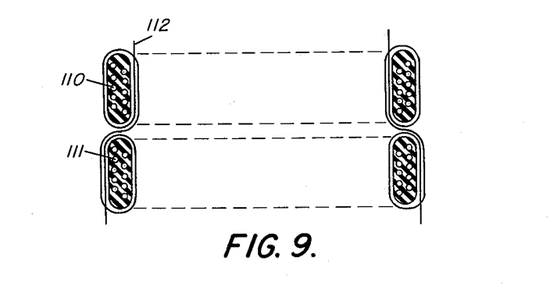
Fig. 9 is a further modification of the transducer.

Fig. 9 illustrates an alternative form of magnetostrictive transducer in which the cores 110 and 111 each comprise two short cylinders each formed by two layers of magnetostrictive rod or wire. Each cylinder is moulded into a suitable pliable but insulating bonding sheath. The two cylinders are placed end-to-end and a winding is provided for each, such winding being diagrammatically represented by the conductor 112. Conductor 112 is disposed about core 110 in a clockwise direction and then connected to or otherwise extended to encircle core 111 in a counterclockwise direction. As a result, the net magnetic field due to excitation of winding 112 is zero to avoid losses due to the presence of conductive water such as salt water in and around the windings. This modification may be utilized in place of the crystal detector of Fig. 7 or the magnetostrictive detector of Figs. 3 and 4. Either of the three detectors above described may be utilized interchangeably for the pulse transmitter element or for a pulse receiver element such as shown in Fig. 1. Because of a higher electromechanical efficiency, the crystal type detector of Fig. 7 is preferred for use as a receiver.

Having described the structural features of the transducers forming the transmitter 11 and receiver 12 and the embodiments of pulser 13 shown in Figs. 6 and 8, reference may now be had to Fig. 1 for a detailed description of the synchronizing control system 30 and its operation in conjunction with the recorder 31. Coil 40 is connected by way of conductor 120 and condenser 121 to the input of an amplifier tube 122. The output of amplifier tube 122 is connected through condenser 123 to the input grid of a tube 124 forming one-half of a bi-stable multivibrator 125. Coil 41 is connected by way of conductor 130 and condenser 131 to the control grid of an amplifier tube 132 whose output is connected by way of condenser 133 to the grid of a tube 134 forming the second half of the bi-stable multivibrator 125. The grids of tubes 124 and 134 are connected through resistors 126 and 136 to the negative terminal of a battery 127 whose positive terminal is connected to ground.

Since the steps on cams 32 and 33 diametrically oppose each other, the voltage pulses, one pulse from each of coils 40 and 41 per cycle of shaft 35, cause the multivibrator 125 to operate through one complete cycle through every revolution of the cylinder 36. By this means multivibrator 125 produces a square wave output at the anode of tube 124 which is transmitted by way of condenser 128 and resistor 129 to the control grid of a phase inverter stage including tube 140. The cathode of the phase inverter is connected by way of conductor 141 and condenser 142 to the control grid of a cathode follower stage 143 whose output, through condenser 144, is connected to pulser 113 to actuate the same once for each revolution of cams 32 and 33 and consequently at a pulse repetition rate of twelve pulses per second.

Figure 11:
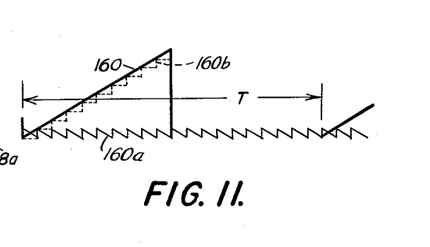
Fig. 11 is a plot of voltage functions produced by the system of Fig. 1.

The cathode of phase inverter 140 is also connected through condenser 150 and resistor 151 to the control grid of a sweep voltage generator which includes tube 152. More particularly, the negative one-half cycle of the square wave output from multivibrator 125 renders tube 152 non-conductive. While tube 152 is cut off, condenser 154 is charged from battery 183 through resistor 153 which is proportioned in dependence upon the size of condenser 154 so that the charge on condenser 154 builds up at a linear rate. Upon positive half-cycles of the square wave from tube 140, tube 152 conducts rapidly to discharge condenser 154. Thus a voltage is applied to the grid of the amplifier 155 of the form illustrated by the solid line 160, Fig. 11. Condenser 156 and resistor 157 couple tube 155 to a signal mixing terminal 158. The time interval T, Fig. 11, represents the period of one revolution of cams 32 and 33. It is to be noted that the output of tube 155 on alternate half-cycles rises linearly from zero to a maximum and abruptly drops to zero. The latter voltage is applied through the succeeding stages of the system of Fig. 1 to the deflecting plates of tube 45 to provide a primary sweep voltage.

During the interval in which the waveform 160 is at a zero level a voltage is applied from tube 140 through condenser 161 and conductor 162 to the control grid represented by the element 163 of cathode ray tube 45 to blank the stream of electrons in the cathode ray tube. Thus the system is operative only during one-half of each cycle of rotation of cams 32 and 33.

It should be kept in mind that two other voltages are mixed with the sweep voltage 160 at point 158. The first of these voltages is the output of receiver 20 transmitted by way of condenser 21 and resistor 22 and conductor 165. This signal represents the pressure waves detected by receiving transducer 12 suitably amplified in receiver 20.

The third component of the voltage applied to terminal 158 is generated in coil 42. The twenty teeth or serrations on cam 34 produce a 240 cycle voltage on conductor 170. This voltage is then applied through a transformer 171 to the grid of tube 172. The output of tube 172 is coupled through condenser 173 and resistor 174 to the grid of tube 175. The voltage from coil 42, a sine wave, is highly amplified through the combination of input transformer 171 and the input amplifier stages which include tubes 172 and 175. Thus the sine wave amplified beyond the linear range of the amplifier becomes a square wave at the anode of tube 175. The output, which is a square wave at the anode of tube 175, is transmitted by way of condensers 176 and 177 to the grid of tube 178. The point intermediate condensers 176 and 177 is connected to ground by way of a resistor 179 and a rectifier 180. The grid of tube 178 is connected to ground by way of resistor 181. Operation in the circuit between tubes 175 and 178 is such that the square wave is doubly differentiated to produce across resistors 179 and 181 sharp positive and negative pulses. The negative peaks are clipped or shunted by rectifier 180. The positive peaks are further sharpened by differentiation in condenser 177 and resistor 181 for application to the grid of tube 178. Further, the operation is such that tube 178 is self-biased through current flow in resistor 181 and is permitted to conduct only in the very short interval of time in which the sharp high voltage pulses from condenser 177 are present.

Operation of tube 178 permits the generation of a saw tooth waveform having frequency of 240 cycles per second. The waveform is produced by the repetitive discharge of condenser 182 connected between the anode of tube 178 and ground. Condenser 182 is periodically charged from battery 183 through resistor 184. The rate of charging is controlled by the time constant of the circuit including resistor 184 and condenser 182. Discharge of condenser 182 is produced upon application of sharp spikes to the grid of tube 178. The time of discharge is approximately five percent the charging time. Thus at the anode of tube 178 there is produced a 240 cycle sawtooth voltage which is applied to the mixing terminal 158 by way of condenser 166 and resistor 167.

The combined voltage from tubes 155 and 178 is illustrated by the dotted staircase waveform shown in Fig. 11. In practice the signal voltage from receiver 20 rides on top of this staircase waveform. The three combined voltages are then applied through two amplifier stages which include tubes 190 and 191 to an output amplifier 192. Amplifier 192 is of conventional design adapted to drive the deflection plates 193 and 194 of the cathode ray oscilloscope 45. Plates 195 and 196 of oscilloscope 45 are driven from the output amplifier 197. Amplifier 197 is energized by the 240 cycle saw-tooth voltage transmitted from the anode of tube 178 by way of condenser 198. The 240 cycle voltage on deflecting plates 195 and 196 produces a horizontal traverse of the cathode ray beam such as shown in Fig. 2 in the duration of each horizontal segment of the staircase waveform shown in Fig. 11. By the co-action of the three voltages applied to mixing terminal 158 and thence to plates 193 and 194 and the 240 cycle saw-tooth waveform from amplifier 197 applied to plates 195 and 196, a display such as shown in Fig. 2 is produced.

The received acoustic signal transducer 12 is displayed in minute detail along an extended time scale permitting a detailed study of phase and character features thereof.

Figure 10:
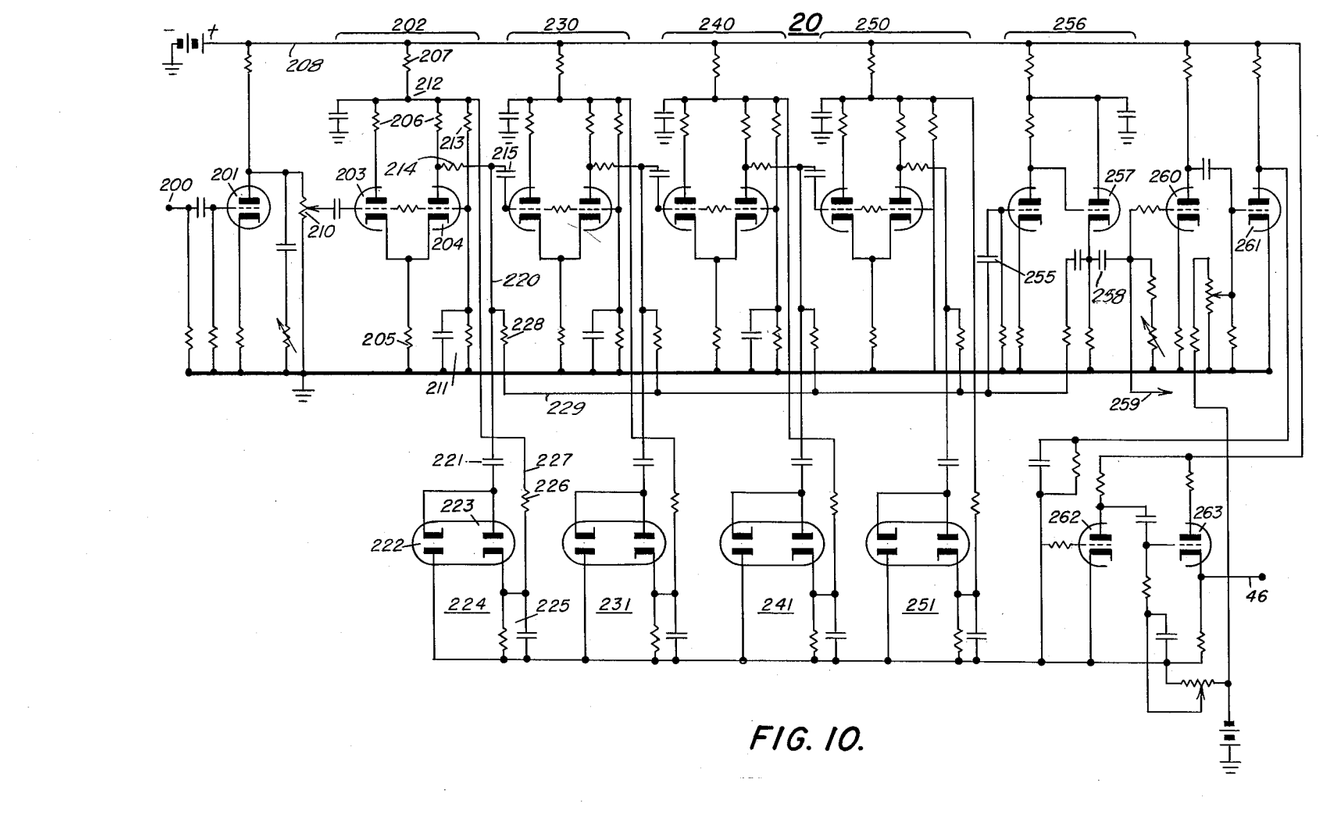
Fig. 10 is a detailed circuit diagram of receiver 20 of Fig. 1.

Fig. 10 illustrates in detail the circuit diagram of the receiver 20 of Fig. 1. The signal output of receiving transducer 12 is applied to input terminal 200 which is coupled to the control grid of an input amplifier 201. The output of amplifier 201 is applied to amplifier 202, the first of four identical amplifier stages. Amplifier 202 includes two triodes 203 and 204 whose cathodes are connected directly together and then to the ground bus by way of cathode resistor 205. The anodes are connected together through resistors 206 and then by way of resistor 207 to the B+ bus 208. The grid of tube 203 is connected through the gain control resistor 210 to ground. The grid of tube 204 is connected to ground through the RC network 211 and to the juncture 212 between the resistors 206 and 207 by way of resistor 213. The anode of tube 204 is connected by way of resistor 214 and condenser 215 to the input grid of the following stage.

The juncture between resistor 214 and condenser 215 is connected by way of conductor 220 and condenser 221 to the cathode and anode of diodes 222 and 223, respectively. Diodes 222 and 223 comprise a non-linear shunt network 224. The anode of tube 222 and cathode of tube 223 are then connected by way of network 225, resistor 226 and conductor 227 to the juncture 212. Shunt network 224 permits the output of amplifier 202 to reach a certain maximum level and then clips the output voltage excursions which exceed the predetermined level. Thus the four amplifier stages 202, 230, 240 and 250, together with their non-linear shunt networks 224, 231, 241 and 251, are effectively connected in series. However, it is to be noted that the juncture between resistor 214 and condenser 215 is connected by way of resistor 228 to an output bus 229 which is similarly connected to the outputs of each of the amplifiers 230, 240 and 250. In this manner the outputs of amplifiers 202, 230, 240 and 250 are added to form a single output voltage which is substantially logarithmically related to the input signal and which is applied by way of condenser 255 to the input grid of a two stage feedback amplifier 256. The output of the feedback amplifier appearing at the cathode of tube 257 is connected by way of condenser 258 to output conductor 259 which leads to the condenser 21, Fig. 1.

Additionally, the output of tube 257 is connected to four additional stages of amplification including tubes 260, 261, 262 and 263, the latter tube providing a cathode follower output connected by conductor 46 to the electrode 47, Fig. 1, to apply a signal voltage flow between the electrode 47 and the spiral 48.

Figure 12:
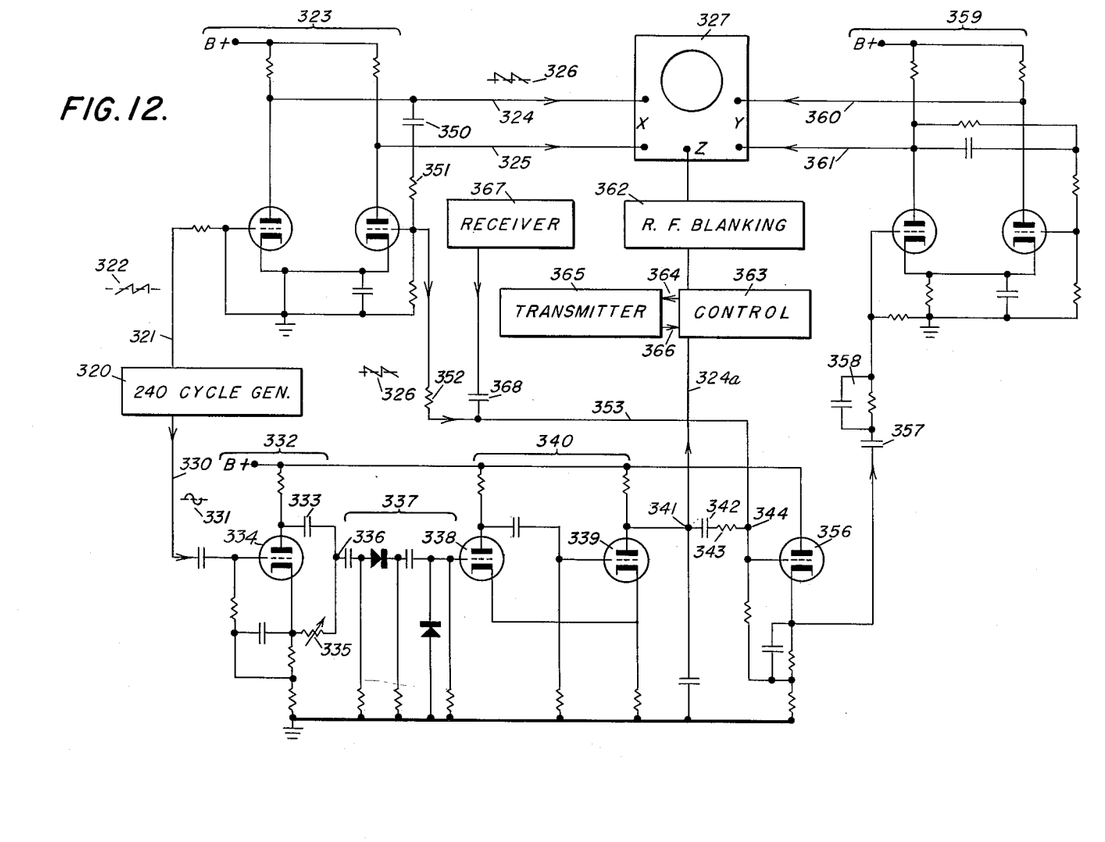
Fig. 12 is a diagram of an electronically controlled system.

The system above described relates to the transmission of acoustic pulses and reception of the reflected energy under the control of a mechanical system which includes the cams 32—34. Fig. 12 illustrates an electronic system for carrying out the foregoing functions. The circuit has been shown partially in block form to facilitate the description thereof.

Referring now to Fig. 12, the electronic system for controlling the transmitter and for registering the received signal has been shown in detail. The operation of the entire system is maintained under the control or synchronized with an oscillator 320 which generates alternating current of 240 cycles per second.

The 240 cycle signal is applied to a first channel 321. On the channel 321 the signal has a saw-tooth waveform 322. The 240 cycle saw-tooth signal 322 is applied to an amplifier 323. The output from amplifier 323 is a 240 cycle saw-tooth signal 326 which is reversed in phase from the signal 322. This signal is then applied to the X-axis input terminals of the oscilloscope 327.

The 240 cycle generator 320 also is connected to a second output channel 330, the signal thereon being of sine wave character such as wave 331. The sine wave signal 331 is applied to a phase shifting network 332 having an output circuit which includes the condenser 333 connected to the anode of tube 334 and a variable resistor 335 connected to the cathode of tube 334. By varying the resistance 335, the signal at point 336 may have any selected phase with reference to the input signal 331. The sine wave output signal at point 336 is clipped and differentiated in the network 337 so that there is applied to tube 338 sharp voltage spikes at the rate of 240 per second. Tube 338, along with tube 339 and the associated electrical components, form a Schmidt saw-tooth oscillator 340 which produces at its output terminal 341 a saw-tooth voltage at a repetition rate of 24 cycles per second. This voltage is applied by way of condenser 342 and resistor 343 to a mixing point or terminal 344.

The 24 cycle saw-tooth voltage having the waveform 160, Fig. 11, is mixed at point 344 with the 240 cycle staw-tooth voltage having the waveform 160a. More particularly, the conductor 324 is connected by way of condenser 350 and resistors 351 and 352 and conductor 353 to the mixing point 344. The signal 160, Fig. 11, is an intermittent saw-tooth wave increasing in voltage as a function of time as represented by the heavy sawtooth outline 160. The 240 cycle wave 160a is characterized by sequential decreases in voltage, the rate of decrease being equal to the rate of increase of the wave 160. As above explained, the two voltages as combined at point 344, Fig. 12, form a stair type waveform represented by the dotted outline 160b. The resultant signal, the wave 160b, is then applied to a cathode follower stage including tube 356 whose output is coupled by way of condenser 357 and network 358 to the input of an amplifier 359 which is identical with amplifier 323. The output of amplifier 359 having the waveform 160b, Fig. 11, is then applied to the Y-axis terminals of oscilloscope 327.

With the voltage 326 applied to the X-axis on conductors 324 and 325 and the voltage 160b applied to the Y-axis on conductors 360 and 361, there is then produced on the oscilloscope 327 the repeated array shown in Fig. 2. The horizontal deflection is produced by the signal 160a. The vertical position is fixed by the horizontal segments of wave 160b. The trace flyback as represented by the dotted lines in Fig. 2 is controlled by the vertical portions of wave 160b.

The proportions of the system of Fig. 12 which produce the time sequential pattern shown in Fig. 2 as on the oscilloscope 327 essentially form a free running system with the voltages such as may repeatedly produce the raster shown in Fig. 2. However the raster is permitted to be visually presented on oscilloscope 327 only on selected cycles thereof. More particularly, the unit 362 provides the Z-axis modulation for the beam of the oscilloscope 327 and normally blocks the beam as by application of a D.C. voltage to the control grid of the oscilloscope. The blanking unit 362 in this modification preferably includes a radio frequency oscillator (not shown in detail) having a rectified output to produce the D.C. control voltage for Z-axis modulation. The R.F. oscillator is keyed off, removing the blanking voltage from the oscilloscope 327 in response to selected components of the 24 cycle signal 160 applied from point 341 to the control network 306 by way of channel 324a. As is well understood by those skilled in the art, the control network 363 may be adapted to transmit a pulse by way of channel 364 to the transmitter 365 at a submultiple of the frequency of the signal 160. Thus transmitter 365 may be actuated to produce acoustic waves in an adjacent medium at any selected rate in the range of from 2 to 12 times per second. Each time transmitter 365 is energized a pulse is transmitted back to the control unit 363 by way of channel 366. This pulse is then utilized to key the R.F. blanking unit off, permitting the oscilloscope beam to trace its excursion across the face of the oscilloscope.

Following generation of each acoustic pulse by transmitter 365, waves detected by receiver 367 are connected by way of condenser 368 to the channel 353 and thus the received signal is mixed with the staircase waveform 160b as at point 344 to alter the otherwise quiescent condition of the raster shown in Fig. 2.

It should be noted that waves 62 and 63, Fig. 2, initially break upward which indicates reflection of acoustic energy from the top of a bed harder than one immediately above it. Reflection 64 breaks downward indicating reflection from the top of a bed softer than the one immediately above it. The final wave breaks upward indicating a harder bed at greater depth.

In practice transmitters 11 and 12 may be mounted in a hydrosonde type unit which may be supported by suitable outrigging from a boat for submerged travel. As above explained, the transmitter and receiver may also be mounted in the hull of a vessel as in a sea chest with the vessel in either case carrying the electronic portions of the system above described. The craft may then be propelled over a preselected course continuously to record on recorder 31, Fig. 1, a representation of the geology of the submerged strata. Simultaneously the face of the oscilloscope may be photographed periodically to record in detail the character of such submerged strata. It has been found convenient to photograph the oscilloscope 45 with a camera of the Polaroid Land type in which films may be immediately developed without the need for additional darkroom facilities.

The use of a matched and substantially critically damped transmitter together with single cycle pulse excitation permits clear delineation of submerged interfaces by the time, amplitude and phase measurements. In the embodiment of transducers in Figs. 3, 4 and 7 the cone was a right cone enclosing an air filled zone. It will be appreciated that other substances may occupy the zone so long as there is a high contrast in the acoustic impedance between the liquids outside the cone and the material of or outside the cone. For example, a solid steel cone would serve satisfactorily. The active faces of the transducers, the lower plane surfaces thereof, are preferably positioned at the same level in the supporting craft and are parallel so that the system is directionally preferential to vertically traveling energy.

The rate of excitation of the transducers will depend upon the depth to which the study is to be made. The interval between pulses must be sufficiently long to permit the acoustic energy to travel to the greatest depth of interest and return before a succeeding pulse is generated. The selection of this interval together with the use of substantially single cycle acoustic impulses facilitates recording reflections from the interfaces below the bed of the water body. Thus the present invention broadly relates to the use of a fathometer which includes an electromechanical transducer means for repeatedly applying and receiving acoustic pulses to and from the fluid covering an area to be explored. The transducer means is acoustically matched to the fluid to produce the nonresonant single cycle acoustic pulses. A receiver including a recorder for the fathometer is adapted to receive on a chart the electrical signals from the transducer following the generation of each acoustic pulse and is permitted to receive such impulses over a time interval which is substantially greater than the time of travel of the acoustic pulses from the fathometer to the bed of the fluid and return. Thus if the fathometer is moved along a predetermined traverse through the fluid and a chart concomitantly moved in the recorder, a record of the submerged strata may be obtained.

While the invention has been described in connection with certain embodiments thereof, it will be understood that further modifications will now suggest themselves to those skilled in the art and it is intended to cover such modifications as fall within the scope of the appended claims.

What is claimed is:

1. A liquid coupled seismic surveying system comprising a recorder having a recording element adapted cyclically to scan a recording chart, synchronous means coupled to said element for producing a control pulse at the instant in each scanning cycle when said recording element is at a datum on said recording chart, a capacitive element and a power source interconnected for charging said capacitive element, a discharge circuit for said capacitive element including transducer means, a control system connected between said synchronous means and said discharge circuit for closing said discharge circuit in response to each said control pulse, means for supporting said transducer means within a liquid disposed over the area seismically to be explored and oriented to direct energy to and receive energy reflected from submerged acoustic interfaces below the bed of said liquid, and a signal channel connected to said transducer means for applying electrical signals to said recorder corresponding in time with the arrival at said transducer means of said reflected energy, said signal channel including non-linear attenuating means responsive to variations in instantaneous values of said electrical signals substantially logarithmically to reduce the amplitudes of said reflected energy for recordation thereof.

2. A liquid coupled seismic surveying system comprising a recorder adapted to receive a recording chart in a recording zone therein and having a recording element adapted cyclically to scan said recording zone, synchronous means coupled to said element for producing a control pulse at the same instant in each scanning cycle of said element, a capacitive element and a power source interconnected for charging said capacitive element, a discharge circuit connected to said capacitive element including transducer means, a control system connected between said synchronous means and said discharge circuit for closing said discharge circuit in response to each said control pulse, means coupled to said transducer means for supporting said transducer means within a liquid disposed over the area seismically to be explored and oriented to direct energy to and receive energy reflected from submerged acoustic interfaces below the bed of said liquid, and a signal circuit interconnecting said transducer means and said recorder for applying electrical signals to said recorder corresponding in time with the arrival at said transducer means of said reflected energy, said signal circuit including non-linear attenuating means responsive to variations in instantaneous values of said electrical signals substantially logarithmically to reduce the amplitudes of said reflected energy for recordation thereof.

3. A liquid coupled seismic surveying system comprising a recorder adapted to receive a recording chart in a recording zone therein and having a recording element adapted cyclically to scan said recording zone, synchronous means coupled to said element for producing a control pulse at the same instant in each scanning cycle of said element, a capacitive element and a power source interconnected for charging said capacitive element, a discharge circuit connected to said capacitive element including transducer means inundated within a liquid disposed over the area seismically to be explored for directing energy to and receiving energy reflected from submerged acoustic interfaces below the bed of said liquid, a control system connected between said synchronous means and said discharge circuit for closing said discharge circuit in response to each said control pulse, and a signal circuit interconnecting said recorder and said transducer means for applying electrical signals to said recorder corresponding in time with the arrival at said transducer means of said reflected energy, said signal circuit including electrically non-linear means responsive to variations in instantaneous values of said electrical signals for modifying the time-amplitude relationships of said signals for recordation thereof.

4. A liquid coupled seismic surveying system comprising a recorder adapted to receive a recording chart in a recording zone therein and having a recording element adapted cyclically to scan said recording zone, synchronous means coupled to said element for producing a control pulse at the same instant in each scanning cycle of said element, a capacitive element and a power source interconnected for charging said capacitive element, a discharge circuit connected to said capacitive element including transducer means, a control system connected between said synchronous means and said discharge circuit for closing said discharge circuit in response to each said control pulse, means mechanically coupled to said transducer means for supporting said transducer means within a liquid disposed over the area seismically to be explored and oriented to direct energy to and receive energy reflected from submerged acoustic interfaces below the bed of said liquid, and a signal circuit interconnecting said recorder and said transducer means for applying electrical signals to said recorder corresponding in time with the arrival at said transducer means of said reflected energy, said signal circuit including non-linear attenuating means responsive to variations in instantaneous values of said electrical signals for recordation thereof.

5. A liquid coupled seismic surveying system comprising a recorder adapted to receive a recording chart in a recording zone therein and having a recording element adapted cyclically to scan a recording chart, synchronous means coupled to said element for producing a control pulse at the same instant in each scanning cycle of said element, a capacitive element and a power source interconnected for charging said capacitive element, a discharge circuit connected to said capacitive element including transducer means, a control system connected between said synchronous means and said discharge circuit for closing said discharge circuit in response to each said control pulse, means mechanically coupled to said transducer means for supporting said transducer means within a liquid disposed over the area seismically to be explored and oriented to direct energy to and receive energy reflected from submerged acoustic interfaces below the bed of said liquid, and a signal circuit interconnecting said recorder and said transducer means for applying electrical signals to said recorder corresponding in time with the arrival at said transducer means of said reflected energy for recordation thereof.

References Cited in the file of this patent

UNITED STATES PATENTS

| | | |
|---|---|---|
| 1,853,119 | Fessenden | Apr. 12, 1932 |
| 2,005,741 | Hayes | June 25, 1935 |
| 2,083,344 | Newhouse et al. | June 8, 1937 |
| 2,131,993 | Wittkuhns et al. | Oct. 4, 1938 |
| 2,400,796 | Watts et al. | May 21, 1946 |
| 2,416,314 | Harrison | Feb. 25, 1947 |
| 2,418,538 | Yetter | Apr. 8, 1947 |
| 2,464,708 | Moseley | Mar. 15, 1949 |
| 2,473,971 | Ross | June 21, 1949 |
| 2,474,266 | Lyons | June 28, 1949 |
| 2,617,874 | Lewis | Nov. 11, 1952 |
| 2,683,239 | Rieber | July 6, 1954 |

FOREIGN PATENTS

| | | |
|---|---|---|
| 375,375 | Great Britain | June 20, 1932 |
| 467,997 | Great Britain | June 28, 1937 |

OTHER REFERENCES

Publication, "Navy Announces New Ocean Bottom Mining," San Diego Union, April 12, 1953, page A–23.

UNITED STATES PATENT OFFICE
CERTIFICATE OF CORRECTION

Patent No. 2,981,357                                    April 25, 1961

William B. Huckabay et al.

It is hereby certified that error appears in the above numbered patent requiring correction and that the said Letters Patent should read as corrected below.

Column 1, line 40, for "air" read -- aid --; column 2, line 24, for "ber" read -- bed --; line 37, for "position" read -- positioned --; column 3, line 12, for "than" read -- then --; column 9, lines 5 and 6, for "resistor" read -- resistance --; line 55, strike out "the", first occurrence; column 10, line 7, for "staw-tooth" read -- saw-tooth --; line 35, for "proportions" read -- portions --; line 53, for "306" read -- 363 --; column 12, line 16, for "compris-" read -- comprising --.

Signed and sealed this 30th day of January 1962.

(SEAL)
Attest:

ERNEST W. SWIDER                                  DAVID L. LADD
Attesting Officer                               Commissioner of Patents